(12) United States Patent
Harris

(10) Patent No.: US 6,230,549 B1
(45) Date of Patent: May 15, 2001

(54) HAND-HELD FUEL CAP LEAKAGE TESTER

(75) Inventor: Robert S. Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/530,153

(22) PCT Filed: Oct. 29, 1998

(86) PCT No.: PCT/US98/22987
§ 371 Date: Apr. 25, 2000
§ 102(e) Date: Apr. 25, 2000

(87) PCT Pub. No.: WO99/22215
PCT Pub. Date: May 6, 1999

Related U.S. Application Data
(60) Provisional application No. 60/063,533, filed on Oct. 29, 1997.

(51) Int. Cl.[7] ............................................. G01M 3/32
(52) U.S. Cl. .................................. 73/49.7; 73/40
(58) Field of Search .......................... 73/40, 49.7

(56) References Cited

U.S. PATENT DOCUMENTS

| | | | |
|---|---|---|---|
| 3,807,219 * | 4/1974 | Wallskog | 73/40 |
| 4,497,290 | 2/1985 | Harris . | |
| 5,069,062 | 12/1991 | Malecek et al. . | |
| 5,323,640 * | 6/1994 | Porcaro et al. | 73/40 |
| 5,898,103 | 4/1999 | Denz et al. . | |
| 5,952,559 * | 9/1999 | Harris et al. | 73/49.7 |
| 5,996,402 | 12/1999 | Harris | 73/49.7 |

* cited by examiner

*Primary Examiner*—Daniel S. Larkin
(74) *Attorney, Agent, or Firm*—Barnes & Thornburg

(57) ABSTRACT

A fuel cap leakage tester is provided comprising a fuel cap support, a pressure source, and a monitor. The fuel cap support is formed to included a test chamber and is adapted to receive a fuel cap to be tested in the test chamber to establish a pressurizable region, therein and a sealed connection between the fuel cap to be tested and the fuel cap support. The monitor is positioned to communicate with the pressurizable region formed in the fuel cap support and is configured to measure air pressure in the pressurizable region. The fuel cap leakage tester further comprises a system for communicating a flow of pressurized air from the pressure source to the pressurizable region with a predetermined pressure drop of the pressurized air therebetween. The monitor measures the pressure level of the pressurized air in the pressurizable region to determine whether the fuel cap to be tested meets or exceeds a predetermined leakage flow rate.

44 Claims, 8 Drawing Sheets

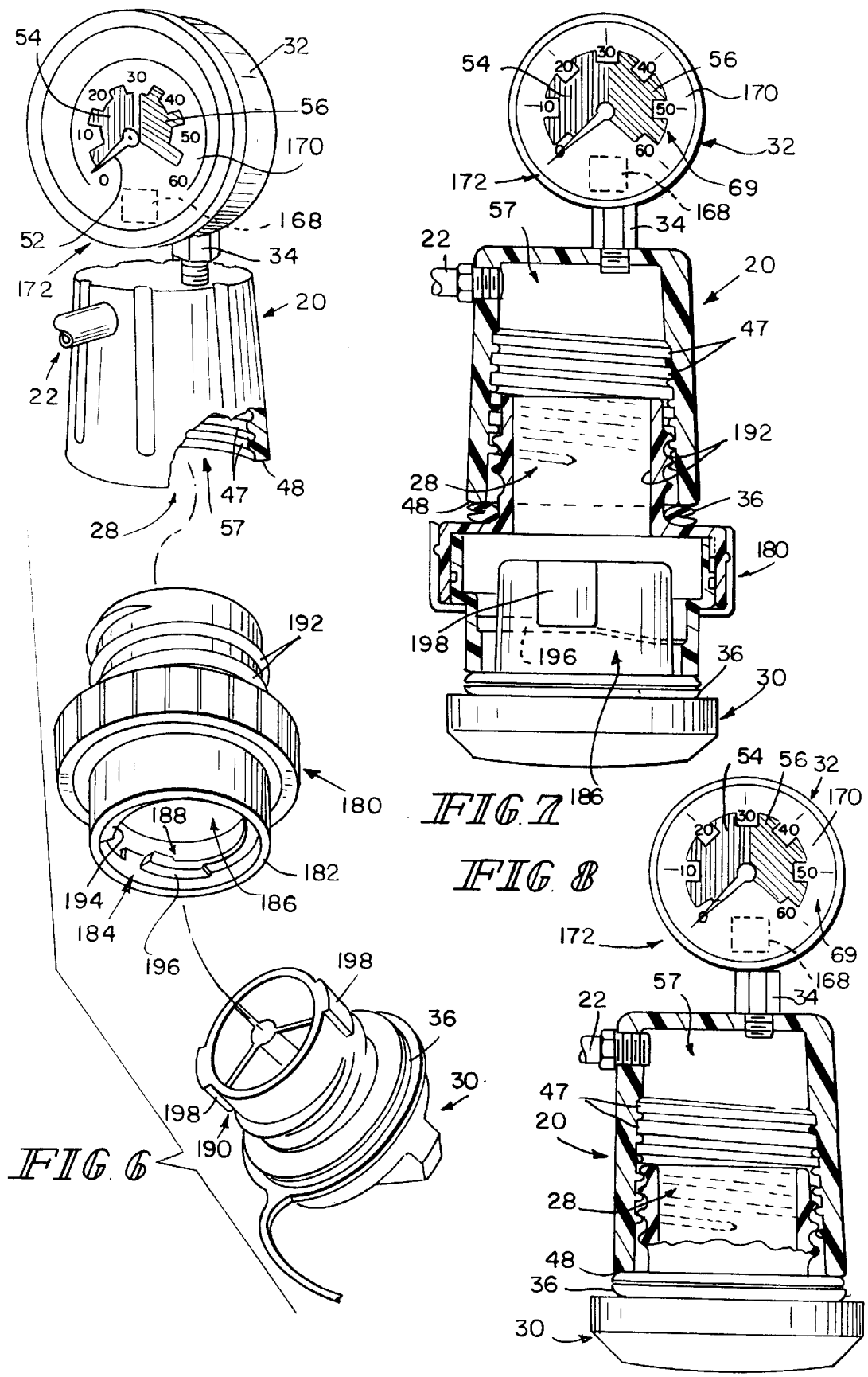

HAND-HELD FUEL CAP LEAKAGE TESTER

This application is a 371 of PCT/US 98/22987, filed Oct. 29, 1998, which claims benefit of Provisional appl. 60/063,533, filed Oct. 29, 1997.

BACKGROUND AND SUMMARY OF THE INVENTION

The present invention relates to a leakage tester, and particularly to a fuel cap leakage tester for testing whether a vehicle fuel cap seals properly against a tank filler neck of a vehicle and for testing whether interior valves of the fuel cap seal properly. More particularly, the present invention relates to a portable fuel cap leakage tester to which a fuel cap mounts during the leakage test after removal of the fuel cap from a tank filler neck of a vehicle.

It is desirable for fuel caps to seal properly the fuel tank filler necks of vehicles so that, for environmental reasons, fuel vapors are prevented from leaking into the atmosphere. Devices that test a fuel cap to determine whether the fuel cap seals properly against the filler neck of a vehicle and to determine whether the fuel cap has any other internal leaks are known. For example, Stant Manufacturing Inc. of Connersville, Indiana manufactures a Model No. 12440 fuel cap leakage tester that performs such a test. The Stant 12440 fuel cap leakage tester is designed for use at state vehicle inspection facilities and includes sophisticated electrical circuitry that operates during the test and that communicates test results automatically to a state computer that stores vehicle inspection data. See, for example, the disclosure in U.S. patent application No. 09/029,004, now U.S. Patent No. 5,996,402 to Robert S. Harris, which disclosure is incorporated by reference herein.

Monitoring of fuel cap integrity at locations away from state vehicle inspection facilities would be enhanced by provision of an inexpensive fuel cap leakage tester that is widely available at locations where fuel caps are sold, such as gas stations, automotive component parts stores, or large department stores having automotive departments. Consumers would welcome the widespread availability of a fuel cap tester that would alert them of the need to replace their fuel cap before their vehicle is examined during a state vehicle inspection. Store owners and gas station owners would also welcome such a fuel cap tester because they could quickly and inexpensively test customer's fuel caps to enable customers with failing fuel caps to detect leakage problems early and to purchase new fuel caps from the store owner or gas station owner as soon as the leakage problems are detected and before the caps are tested at a state vehicle inspection facility.

According to the present invention, a fuel cap leakage tester is provided comprising a fuel cap support, a pressure source, and a monitor. The fuel cap support is formed to include a test chamber and is adapted to receive a fuel cap to be tested in the test chamber to establish a pressurizable region therein and a sealed connection between the fuel cap to be tested and the fuel cap support. The monitor is positioned to communicate with the pressurizable region formed in the fuel cap support and is configured to measure air pressure in the pressurizable region. The fuel cap leakage tester further comprises means for communicating a flow of pressurized air from the pressure source to the pressurizable region with a predetermined pressure drop of the pressurized air therebetween. The predetermined pressure drop causes the pressure level of the pressurized air in the pressurizable region to be less than the pressure level of the pressurized air in the pressure source. The monitor measures the pressure level of the pressurized air in the pressurizable region during discharge of the pressurized air from the pressurizable region through an air leak path between the fuel cap to be tested and the fuel cap support at an unknown flow rate to determine whether the unknown flow rate associated with the fuel cap to be tested meets or exceeds a predetermined leakage flow rate. This measurement by the monitor establishes whether the sealed connection between the fuel cap to be tested and the fuel cap support complies with a predetermined fuel cap leakage rate specification.

In preferred embodiments, a fuel cap leakage tester is configured to receive and pressurize a fuel cap to be tested. The tester includes a pump with a handle that is "pumped" manually by an operator to charge a reservoir to which the pump is coupled. The reservoir includes a pressure-relief valve that operates to ensure that the reservoir is charged to a regulated pressure level. An outlet line from the reservoir is coupled though a series combination of an activation switch and a master orifice to a test base having an interior region into which a fuel cap to be tested is inserted. A pressure gauge is coupled to the test base to measure pressure within the interior region of the test base.

The activation switch is normally in a closed position so that, prior to the test, when the reservoir is being charged by the pump, no air flows from the reservoir to the test base. Either before or after the reservoir is charged, the fuel cap to be tested is inserted into the interior region of the test base to define a pressurizable region inside the test base. In certain cases, to facilitate attachment of a wide variety of fuel caps to a single test base, a customized cap adapter can be mounted in the interior region of the test base and a fuel cap can be mounted on the cap adapter customized to match the fuel cap to define a pressurizable region inside the test base and cap adapter.

During testing, the fuel cap is mounted on a fuel cap support defined by a test base or by a customized cap adapter mounted on a test base. The fuel cap support is formed to include a pressurizable region defined inside the test base or inside the test base and a cap adapter mounted on the test base.

To test the fuel cap after the reservoir has been charged, an operator moves the activation switch manually to an opened position which allows pressurized air to flow from the reservoir through the master orifice and into the pressurizable region in the fuel cap support in which the fuel cap to be tested is inserted. The rate at which the pressurized air flows from the reservoir through the master orifice is higher than the rate at which air leaks from the pressurizable region to the atmosphere. Leakage can take place between the fuel cap and the test base (or cap adapter) and/or through interior valving of the fuel cap. Thus, when the activation switch is moved to the opened position after the reservoir is charged, the pressure in the pressurizable region in the fuel cap support increases and the pressure gauge indicates this pressure increase.

If the difference between the flow rate of pressurized air through the master orifice and the leakage rate of air past the fuel cap is sufficiently large, the pressure in the pressurizable region in the fuel cap support will increase beyond a threshold level and the gauge will indicate that the fuel cap has passed the test. If the difference between the flow rate of air through the master orifice and the leakage rate of the air past the fuel cap is sufficiently small, the pressure in the fuel cap support will not increase to the threshold level and the gauge will indicate that the fuel cap has failed the test.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The description below particularly refers to the accompanying figures in which:

FIG. 6 is a perspective view of the test base and gauge of FIG. 1, showing a fuel cap adapter positioned to be mounted in the test base and configured to receive a fuel cap that is not threaded to be mounted directly in the interior region of the test base;

FIG. 7 is a cross-sectional view of the test base, fuel cap adapter, and fuel cap of FIG. 6 after installation of the cap adapter in the test base and the cap in the cap adapter and showing cooperation of the test base, fuel cap adapter, and fuel cap to define a pressurizable region therebetween;

FIG. 8 is a cross-sectional view of the test base and fuel cap of FIG. 1 after installation of the cap directly in the test base and showing cooperation of the test base and fuel cap to define a pressurizable region therebetween;

DETAILED DESCRIPTION OF THE DRAWINGS

Figure 1:
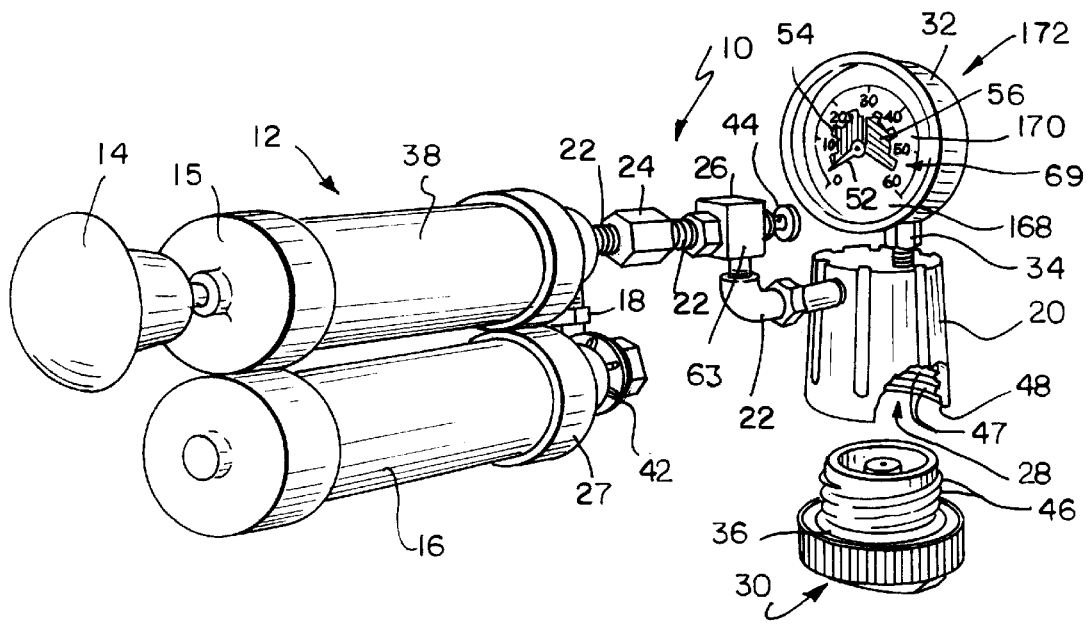
FIG. 1 is a perspective view of a hand-held fuel cap leakage tester in accordance with the present invention showing a pump unit including a first tube with a movable handle and a second tube that provides a portion of a pressurized air reservoir, the second tube becoming charged with pressurized air when the handle is moved back and forth, an outlet line coupling the pump unit to a test base through the series combination of a master orifice and an activation switch, the test base having an interior region into which a fuel cap to be tested is inserted, and a pressure gauge coupled to the test base for measuring the pressure in the interior region of the test base.

A fuel cap leakage tester 10 in accordance with the present invention is shown in FIG. 1. A presently preferred embodiment of fuel cap leakage tester 210 is illustrated in FIGS. 10–13. Customized cap adapters configured to facilitate coupling of a wide variety of types and styles of fuel caps to a tester such as tester 10 or 210 are shown, for example, in FIGS. 6 and 7.

Fuel cap leakage tester 10 is used to determine whether a fuel cap 30 seals properly against a fuel tank filler neck (not shown) of a vehicle (not shown) and to determine whether interior valving (not shown) of fuel cap 30 seals properly. Fuel cap 30 includes an O-ring seal 36 that seals against the vehicle filler neck. Many states have regulations, such as the well-known I/M240 regulation, which prescribe the rate at which fuel vapor may permissibly leak from a vehicle filler neck past fuel cap 30 into the atmosphere. Fuel caps 30 that do not meet applicable state regulations are required to be replaced.

Fuel cap leakage tester 10 includes a pump unit 12 and a test base 20 coupled to pump unit 12 by an outlet line 22 that extends from pump unit 12 to test base 20 through the series combination of a master orifice 24 and an activation switch 26, as shown in FIG. 1. Pump unit 12 includes a first tube 38 and a second tube 16 coupled to first tube 38 by a coupling line 18. Pump unit 12 also includes a movable pump handle 14 that extends beyond an end cap 15 which is attached to first tube 38. Test base 20 is formed to include an interior region 28 into which a fuel cap 30 to be tested is inserted. If fuel cap 30 does not mate properly with test base 20, a cap adapter of the type shown in FIG. 6 can be coupled to test base 20 and fuel cap 30 can then be coupled to the cap adapter on test base 20.

Fuel cap leakage tester 10 also includes a pressure gauge 32 coupled to test base 20 by a pressure line 34. Pressure gauge 32 is configured to measure the fluid pressure in a pressurizable region in (1) the interior region 28 of test base 20, as shown in FIG. 8, or (2) the interior region 28 of test base 20 and the interior region of the cap adapter, as shown in FIG. 6.

Figure 2:
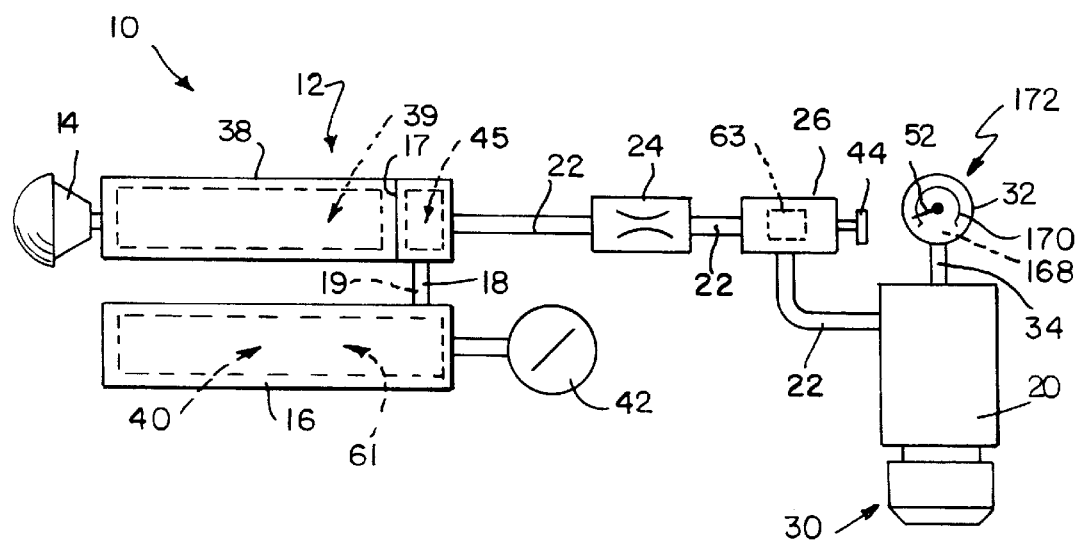
FIG. 2 is a block diagram of the fuel cap leakage tester of FIG. 1.
Figure 3:
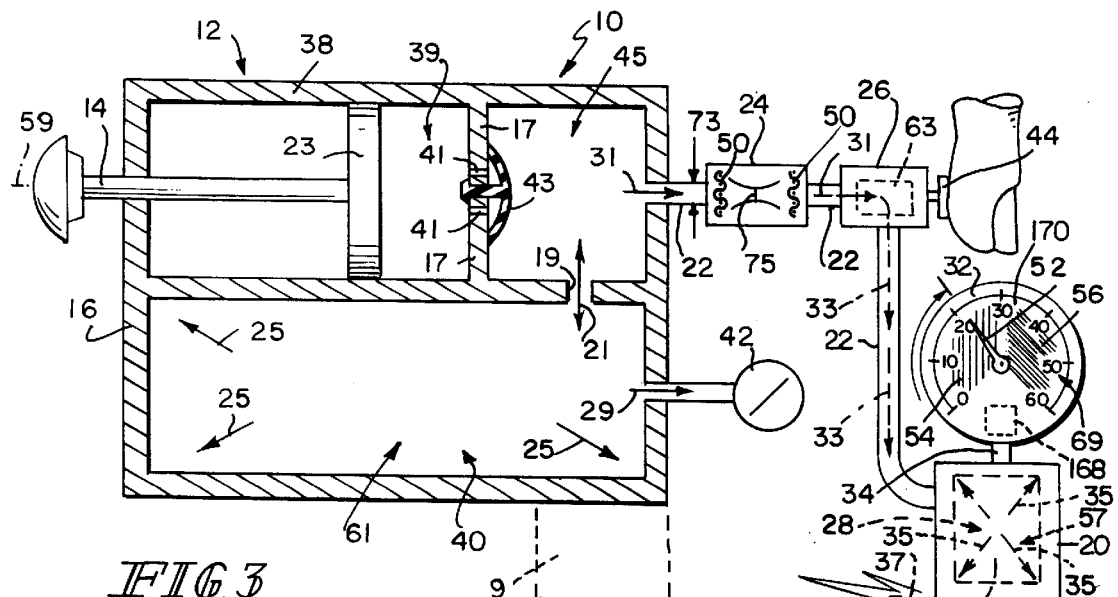
FIG. 3 is a diagrammatic view of the fuel cap leakage tester of FIG. 1 showing a "failing" fuel cap coupled to the test base, the activation switch including a valve moved by a button to an opened position to test the fuel cap, a large amount of pressurized air leaking past the fuel cap, and the pressure gauge indicating that the fuel cap has failed the test.
Figure 4:
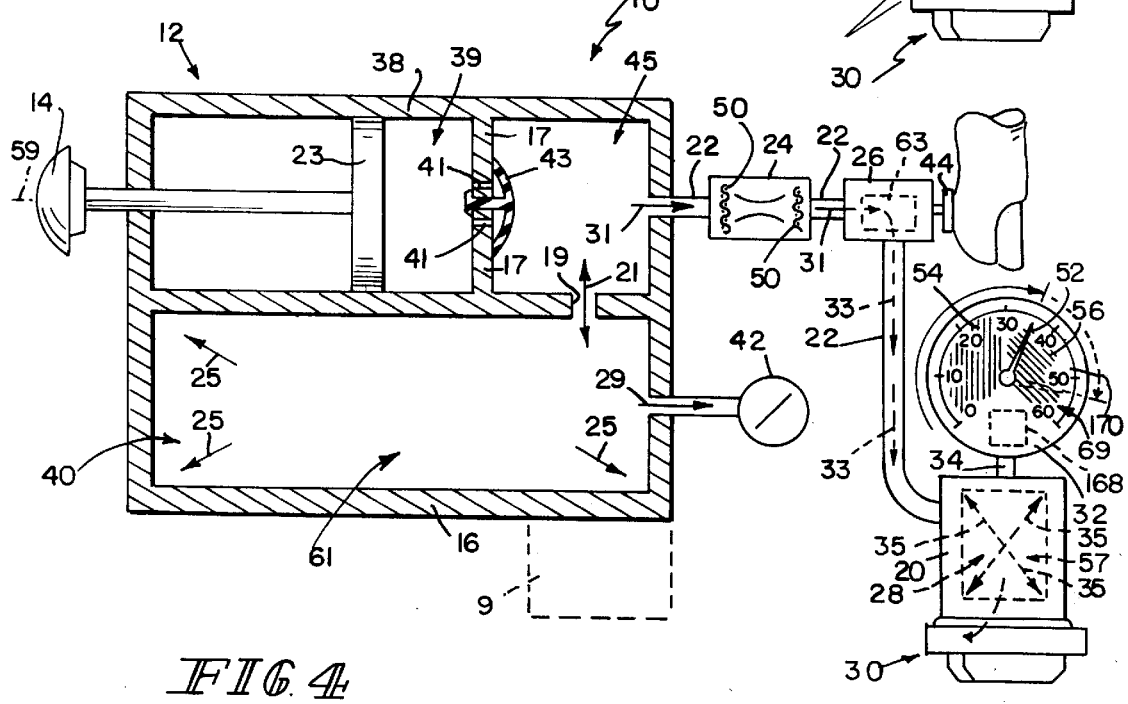
FIG. 4 is a diagrammatic view similar to FIG. 3 showing a "passing" fuel cap coupled to the test base, the valve of the activation switch moved by the button to the opened position, and the pressure gauge indicating that the fuel cap has passed the test.

Pump unit 12 includes an interior wall 17 inside first tube 38 that partitions the interior region of first tube 38 into a pump chamber 39 and an air chamber 45, as shown in FIGS. 2–4. Second tube 16 includes an air chamber 40 and coupling line 18 includes a passage 19. Passage 19 allows air to move between air chamber 45 and air chamber 40 as indicated by a double-headed arrow 21 shown in FIGS. 3 and 4. Pump unit 12 includes a piston 23 inside pump chamber 39 and pump handle 14 is coupled to piston 23.

Before a cap leakage test is conducted, an operator strokes handle 14 of pump unit 12 back and forth along a central axis 59 of first tube 38 so that piston 23 moves back and forth within pump chamber 39 of first tube 38. As piston 23 moves back and forth, air is pushed from pump chamber 39 of first tube 38 through air flow apertures 41, shown in FIGS. 3 and 4, formed in interior wall 17 and past a one-way check valve 43 into air chamber 45. Therefore, pump unit 12 defines a pressurizer. The term "air" as used herein means atmospheric air and any other gases or fluids suitable to be introduced into test base 20 to evaluate fuel cap leakage rates.

Movement of air from pump chamber 39 into air chamber 45 displaces a quantity of air from air chamber 45 into air chamber 40 because air chamber 40 is in fluid communication with air chamber 45 through passage 19 of coupling line 18. Thus, as pump handle 14 is stroked or "pumped" back and forth, the pressure in air chamber 45 of first tube 38 and air chamber 40 of second tube 16 increases as indicated by arrows 25 shown in FIGS. 3 and 4. Fuel cap leakage tester 10 also includes a handle 9 to aid in supporting fuel cap leakage tester 10 during pumping and testing of fuel cap 30. Air chamber 45 cooperates with air chamber 40 to provide leakage tester 10 with a pressurized air reservoir 61.

Fuel cap leakage tester 10 includes a pressure-relief valve 42 mounted on an end cap 27 attached to an end of second tube 16, as shown in FIG. 1. Valve 42 is in fluid communication with air chamber 40 of second tube 1,6 as indicated by arrow 29 shown in FIGS. 3 and 4. Valve 42 opens when the pressure in air chamber 40 of second tube 16 reaches a predetermined level to set the maximum pressure level in air reservoir 61. If handle 14 of pump unit 12 is stroked after the pressure in air chamber 40 reaches the predetermined level, valve 42 opens so that some pressurized air inside air chamber 40 escapes through valve 42 to the atmosphere, thereby preventing the pressure in air reservoir 61 from exceeding the predetermined maximum level. Thus, valve 42 regulates the pressure in air reservoir 61 so that, for each fuel cap leakage test, air reservoir 61 is charged with a substantially identical starting pressure after an operator has moved handle 14 of pump unit 12 back and forth approximately two times.

In preferred embodiments, pressure-relief valve 42 is a spring-biased check valve configured so that the starting pressure in the pressurized air reservoir 61 defined by chambers 40, 45 is eighty inches (80") of water (19.9 kilopascals). When pressure-relief valve 42 opens during the charging of the pressurized air reservoir 61, an audible sound is generated by valve 42 to alert the operator that further stroking of handle 14 is not needed.

Activation switch 26 includes a valve 63 and a button 44 that can be pressed by an operator to move valve 63 from a closed position, shown in FIGS. 1 and 2, to an opened position, shown in FIGS. 3 and 4. Valve 63 is normally in the closed position and is moved to the opened position by the operator to test the leakage rate of fuel cap 30. When air reservoir 61 is charged with pressurized air prior to the fuel cap leakage test, some of the pressurized air is able to reach valve 63 through master orifice 24 and the portion of outlet line 22 between valve 63 and master orifice 24, as indicated by arrows 31 shown in FIGS. 3 and 4. However, while valve 63 is in the closed position, pressurized air is prevented from reaching interior region 28 of test base 20 so that atmospheric pressure is maintained within interior region 28 and within the portion of outlet line 22 extending between valve 63 and test base 20.

Before button 44 is pressed to move valve 63 from the closed position to the opened position, cap 30 is installed into test base 20. Test base 20 is formed to include internal threads 47 and fuel cap 30 is formed to include external threads 46 that mate with the internal threads 47 when fuel cap 30 is installed in test base 20. Test base 20 and a fuel cap 30 installed in test base 20 cooperate to define a pressurizable region 57 therebetween, as shown in FIG. 8. As shown in FIGS. 2–4, test base 20 provides a fuel cap support formed to include a test chamber for fuel caps configured to mate with internal threads 47 provided on test base 20.

Fuel caps come in a wide variety of shapes and sizes, and cam lugs (not shown) and external threads provided on fuel caps also come in a wide variety of shapes and sizes. These cap, lug, and thread styles vary by vehicle model and model year. Thus, it may be necessary to provide a cap adapter if the fuel cap to be tested includes threads that are not sized to mate with threads 47 in test base 20 or if the fuel cap to be tested includes some other type of closure mechanism that does not mate with threads 47 in test base 20.

As shown in FIG. 6, a cap adapter 180 is formed to include external threads 192 that mate with internal threads 47 in test base 20 when a cap adapter 180 is required for installing the fuel cap to be tested on test base 20. Thus, external threads 192 define a connector configured to engage test base 20. Cap adapter 180 is mounted on test base 20 and receives a fuel cap 30 during testing to determine whether fuel cap 30 passes a pressure-based fuel cap leakage test.

Cap adapter 180 also includes an outer rim 182 providing a mouth 184 opening into an interior region 186. Cap adapter 180 further includes a retainer 188 adapted to retain a filler neck closure portion 190 of fuel cap 30 to be tested in a mounted position extending into interior region 186 and closing mouth 184 opening into interior region 186, as shown in FIG. 6, preparatory to determining a leakage rate of pressurized air from pressurizable region 57 through mouth 184 using tester 10. Retainer 188 includes a pair of annular flanges 194, 196, as shown in FIG. 6. In use, these annular flanges 194, 196 will engage lugs 198 on fuel cap 30 to block withdrawal of fuel cap 30 from interior region 186 in cap adapter 180, as shown, for example, in FIG. 7.

Cap adapter 180 provides a connector that is adaptable readily in the field to allow more than one style of fuel cap to be coupled to a test base 20 so that fuel caps associated with a wide variety of vehicle models and model years can be tested quickly and easily using fuel cap leakage tester 10. A further explanation of how cap adapters are used with fuel cap leakage testers is provided in U.S. Pat. application No. 08/974,857, now U.S. Pat. No. 5,952,559 to Robert S. Harris et al., which disclosure is hereby incorporated by reference.

When a cap adapter 180 is used, test base 20, cap adapter 180, and fuel cap 30 cooperate to define pressurizable region 157 therebetween, as shown in FIG. 7. Test base 20 and cap adapter 180 cooperate define a fuel cap support formed to include a test chamber.

When fuel cap 30 is inserted into test base 20, fuel cap 30 is rotated in a cap-advancing direction until O-ring seal 36 seats against a bottom surface 48 of test base 20 to form a sealed connection therewith, as shown in FIG. 8. Fuel cap 30 includes a torque-override mechanism (not shown) of a type well-known to those skilled in the art. The torque-override mechanism operates when O-ring seal 36 seats against bottom surface 48 of test base 20 to prevent overtightening of fuel cap 30.

After air reservoir 61 is charged by back-and-forth movement of pump handle 14 and piston 23, and after fuel cap 30 is installed in test base 20, a fuel cap leakage test is performed by pressing button 44 to move valve 63 from the closed position to the opened position. While button 44 is pressed, air flows into pressurizable region 57 of test base 20 through valve 63 and the portion of outlet line 22 between valve 63 and test base 20, as indicated by phantom arrows 33 shown in FIGS. 3 and 4. When button 44 of activation switch 26 is pressed, the pressurized air in air reservoir 61 is discharged through master orifice 24 into test base 20. Thus, during a test, pump unit 12 provides a housing defining air reservoir 61 and an air supply providing a source of pressure to test base 20 through a passage defined by outlet line 22.

Master orifice 24 includes a precision-drilled hole that is sized to allow air to flow therethrough at a rate that will allow air pressure in pressurizable region 57 to reach a peak of thirty inches of water (7.47 kilopascals) if the leakage rate of air past cap 30 is sixty cubic centimeters per minute at a pressure of thirty inches of water (7.47 kilopascals). A filter 50 is positioned to lie on each side of master orifice 24, as shown in FIGS. 3 and 4. Filters 50 prevent contaminants from reaching the precision-drilled hole formed in master orifice 24. In preferred embodiments, filters 50 are twenty-five micron screens.

Production fuel caps typically have leakage rates from less than two cubic centimeters per minute to about ten cubic centimeters per minute when installed in the filler necks of associated vehicles. Thus, fuel cap leakage tester 10 is configured so that air flows from the pressurized air reservoir 61 through master orifice 24 at a rate higher than the rate at which air leaks to the atmosphere between fuel cap 30 and test base 20 and through the interior valving of fuel cap 30. When valve 63 in switch 26 is moved to the open position after the pressurized reservoir is charged, the air pressure in pressurizable region 57 of test base 20 increases, as indicated by phantom arrows 35 shown in FIGS. 3 and 4.

Pressure gauge 32 includes an indicator needle 52 that deflects to indicate the pressure in pressurizable region 57 of test base 20. Pressure gauge 32 is configured to measure pressures above and below a threshold pressure level or "pass point", which is thirty inches of water (7.47 kilopascals) if fuel cap leakage tester 10 is made to test fuel caps for compliance with the approximate regulation. Pressure gauge 32 also includes "failing" indicia 54 and "passing" indicia 56. Failing indicia 54 and passing indicia 56 may be color coded patches, such as a red patch to indicate a failing fuel cap and a green patch to indicate a passing fuel cap, or written descriptors, such as "PASS" and "FAIL". Thus, during the fuel cap leakage test, indicator needle 52 deflects to a certain location relative to indicia 54, 56 to provide a visual indication of whether fuel cap 30 passes or fails the test.

Pressure gauge 32 is in communication with pressurizable region 57 when it is exposed to substantially the same air pressure as pressurizable region 57. For example, pressure gauge 32 is in communication with pressurizable region 57 when it is coupled to test base 20, as shown in FIG. 1. Pressure gauge 32 is also in communication with pressurizable region 57 when it is coupled to the portion of outlet line 22 between master orifice 24 and test base 20. Pressure gauge 32 defines a monitor. The monitor and fuel cap support cooperate to define a measuring device.

Pressure gauge 32 includes a pressure detector 168 in communication with pressurizable region 57 that is configured to measure the air pressure in test base 20. Pressure gauge 32 also includes a pressure scale 69 that cooperates with indicia 54, 56 to form a visual display 170. Visual display 170 and indicator needle 52 cooperate to define an indicator 172 included in pressure gauge 32. Indicator 172 is responsive to pressure detector 168 included in pressure gauge 32 and indicates whether fuel cap 30 passes or fails the predetermined specification.

Pressure measuring devices other than gauge 32 may be used to measure the pressure level of pressurized air in pressurizable region 57 of test base 20. For example, a manometer having one end exposed to the pressurizable region and another end exposed to the atmosphere may be used for the pressure detector. A pressure transducer connected to an electronic indicator may also be used for the pressure detector and indicator. Such an electronic indicator may be combined with any type of display, such as a digital numeric display, a digital gradient display, or pass/fail lights, indicating that the fuel cap to be tested has passed the predetermined specification because pressurizable region 57 reaches the predetermined maximum pressure or failed the predetermined specification because pressurizable region 57 failed to reach the predetermined maximum pressure after a specified time.

A pressure switch set to a predetermined pressure may also be used as a pressure measuring device. The pressure switch activates a pass indicator if the pressure in the pressurizable region reached the predetermined pressure or toggle to a fail indicator if the pressure in the pressurizable region failed to reach the predetermined pressure after a specified period of time. For example, if the predetermined pressure level of the pressurizable region associated with a passing cap meeting the predetermined specification is thirty inches of water (7.47 kilopascals) during testing, the pressure switch activates an indicator/display, such as a green/pass light, when the pressurizable region reached thirty inches of water (7.47 kilopascals) and another indicator/display, such as red/fail light, if the pressurizable region failed to reach thirty inches of water (7.47 kilopascals) after a specified period of time.

Figure 15:
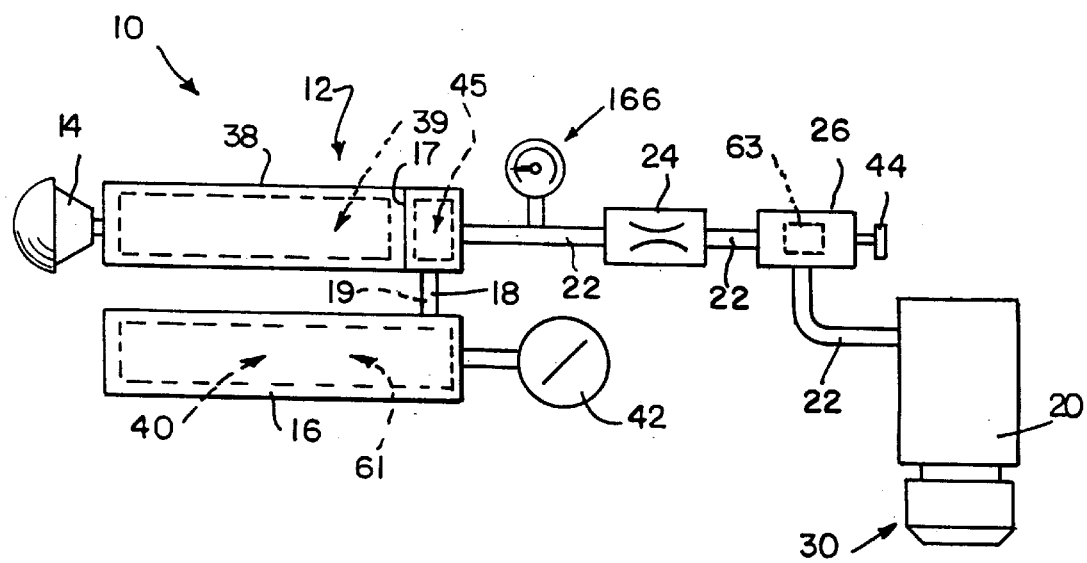
FIG. 15 is a diagrammatic view similar to FIG. 4 showing a "passing"fuel cap coupled to the test base, the valve of the activation switch moved to the opened position, and a flow meter indicating that the fuel cap has passed the test.

A flow meter 166, as shown in FIG. 15, could also be used as a monitor to meter the maximum flow rate through pressurizable region 57 to determine whether the leakage flow rate associated with fuel cap 30 being tested complies or fails to comply with the predetermined specification. By measuring the maximum flow rate through pressurizable region 57, one can deduce the associated leakage rate of a fuel cap 50 being tested from the maximum flow rate through pressurizable region 57 in a manner similar to using pressure gauge 32.

If the flow rate of air through master orifice 24 is sufficiently larger than the leakage rate of air past fuel cap 30, the air pressure in pressurizable region 57 of test base 20 increases beyond the threshold level and indicator needle 52 deflects to a position overlapping passing indicia 56, thereby indicating that fuel cap 30 has passed the test, as shown in FIG. 4. If the flow rate of air through master orifice 24 is not sufficiently larger than the leakage rate of the air past fuel cap 30, the air pressure in pressurizable region 57 of test base 20 will not increase to the threshold level and indicator needle 52 will move to a position overlapping the failing indicia 54 to indicate that fuel cap 30 has failed the test, as shown in FIG. 3.

As air pressure in pressurizable region 57 of test base 20 increases, needle 52 moves from a "zero-pressure" position, shown in FIGS. 1 and 2, in a clockwise direction to positions shown, for example, in FIGS. 3 and 4. The amount that indicator needle 52 moves away from the zero-pressure position provides the test result. As air flows from the pressurized air reservoir 61 through master orifice 24, switch 26, and test base 20 and past fuel cap 30, the pressure in air reservoir 61 decays. Over time, the decay of air pressure in chambers 40, 45 results in indicator needle 52 moving in a counterclockwise direction back toward the zero-pressure position. Thus, to determine whether the fuel cap being tested has passed or failed the test, the operator reads the "highest" reading which is the point of maximum deflection of indicator needle 52 away from the zero-pressure position.

Fuel cap 30 includes interior valving, such as an internal pressure-relief valve (not shown) of the type included in many conventional fuel caps. Typical fuel cap pressure-relief valves are designed to open when the pressure in the associated vehicle filler neck reaches about forty-five inches of water (11.2 kilopascals) to about fifty-five inches of water (13.7 kilopascals). If the fuel cap being tested by fuel cap leakage tester 10 does a superior job of sealing against bottom surface 48 of test base 20, as is the case with fuel cap 30 of FIG. 4, the pressure in pressurizable region 57 of test base 20 increases sufficiently to open the pressure-relief valve of the fuel cap. When the pressure-relief valve opens, indicator needle 52 will be at a maximum deflection position above the pass point, but below the maximum gauge reading of gauge 32. The indicator needle 52 will remain in the maximum deflection position until the pressure in test base 20 starts to decay. The position of indicator needle 52 when the pressure-relief valve of fuel cap 30 opens is shown in FIG. 4 (in phantom).

Figure 5:
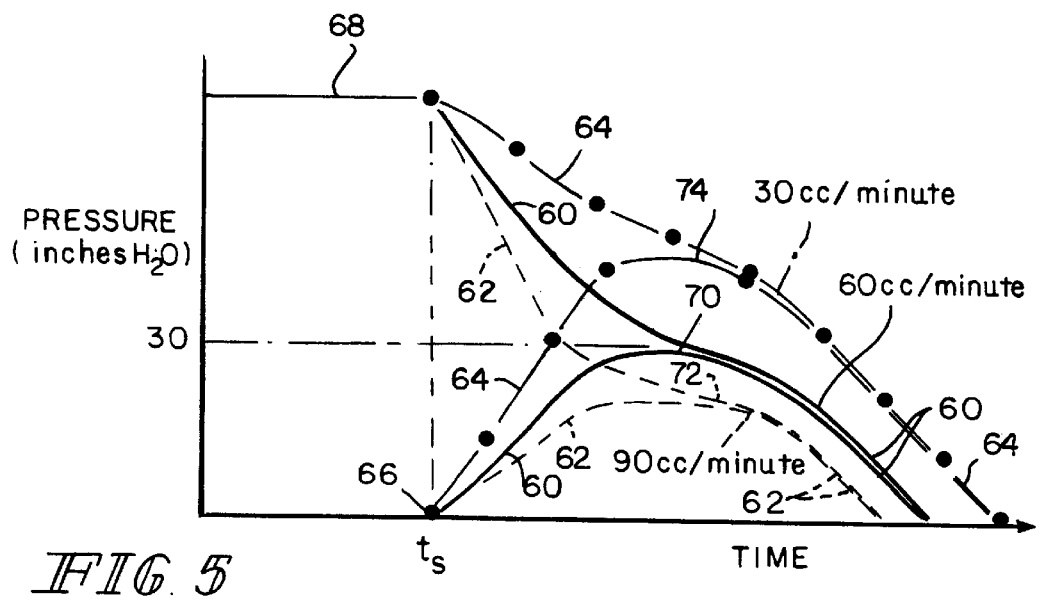
FIG. 5 is a plot of pressure versus time showing how the pressure level in the reservoir and the pressure level in the interior region of the test base is believed to vary with time for three separate fuel caps, one fuel cap passing the test, one fuel cap failing the test, and one fuel cap having a leakage rate at the boundary between passing and failing.

A plot of air pressure versus time, which is representative of how the air pressure level in air reservoir 61 and the air pressure level in pressurizable region 57 of test base 20 is believed to change with time for three separate fuel caps, is shown in FIG. 5. Solid lines 60 correspond to the pressure levels associated with a fuel cap having a leakage rate at the boundary between passing and failing. Plain dotted lines 62 correspond to the pressure levels associated with a failing fuel cap, and lines 64 having alternating dots and dashes correspond to the pressure levels associated with a passing fuel cap.

After air reservoir 61 is charged with pressurized air and prior to a time 66 at which valve 63 is moved from the closed position to the opened position, the pressure in pressurizable region 57 of test base 20 is zero inches of water (zero pascals) and the pressurizable region 57 of test base 20 is at the predetermined maximum level dictated by pressure-relief valve 42, as indicated by straight line segment 68 shown in FIG. 5. It should be understood that the pressure level read by pressure gauge 32 is the pressure difference between atmospheric pressure and the pressure to which gauge 32 is exposed through pressure line 34. In a preferred embodiment, gauge 32 is a commercially available Ashcroft® gauge having a beryllium copper diaphragm and a brass socket. Other suitable analog gauges may also be used to provide gauge 32.

At time 66 when valve 63 in switch 26 is moved from the closed position to the opened position, the pressure in air reservoir 61 decays and the pressure in pressurizable region 57 of test base 20 rises, as shown in FIG. 5. The rate at which the pressure in air reservoir 61 decays is dependent upon the rate at which air leaks past fuel cap 30 installed in test base 20. If the leakage rate of fuel cap 30 is relatively large, as indicated by phantom arrow 37 shown in FIG. 3, the pressure in air reservoir 61 decays relatively quickly, as indicated by an upper segment of line 62, and the pressure in test base 20 is not able to rise above the threshold level. If the leakage rate of fuel cap 30 being tested is relatively small, the pressure in air reservoir 61 decays relatively slowly, as indicated by an upper segment of line 64, and the pressure in test base 20 is able to rise above the threshold level.

At some critical point during the test, the pressure in air reservoir 61 continues to decrease and the pressure in pressurizable region 57 in test base 20 stops rising. After the critical point of the test, the pressures in air reservoir 61 and test base 20 decay together, as shown in FIG. 5. Thus, in FIG. 5, the critical point is the point after time 66 at which the upper and lower segments of respective lines 60, 62, 64 merge close together and decay at substantially the same rate to become substantially parallel lines. Thus, a critical point 70 is associated with lines 60, a critical point 72 is associated with lines 62, and a critical point 74 is associated with lines 64 when lower segment of respective lines 60, 62, 64 peak and begin to decrease, as shown in FIG. 5. Eventually, if the operator continues to press button 44 to place valve 63 in the opened position for a long enough period of time, the pressure in air reservoir 61 and the pressure in test base 20 will return to atmospheric pressure, and indicator needle 52 of gauge 32 will indicate an air pressure reading of zero inches of water (zero pascals), as shown in FIG. 5.

Thus, fuel cap leakage tester 10 is a "flow" device having precise pressure regulation in air reservoir 61 and having a precision-drilled hole characterized by a predetermined inside diameter in master orifice 24. In preferred embodiments of fuel cap leakage tester 10, the combination of pressure, orifice size, and reservoir volume produces a maximum pressure of about thirty inches of water (7.47 kilopascals) in test base 20 at a cap leakage rate of about sixty cubic centimeters per minute. By adjusting the pressure at which pressure-relief valve 42 opens, the size of the hole formed in master orifice 24, and the volume of the pressurized air reservoir 61 defined by chambers 40, 45, fuel cap leakage tester 10 can be adjusted to test for other leakage rates or for other configurations of pressure, orifice size, and reservoir volumes for the same leakage rates.

As stated above, pressure-relief valve 42 limits the pressure level in air reservoir 61 to a predetermined value; air reservoir 61 has a predetermined volume (one hundred fifty cubic centimeters); and master orifice 24 provides a predetermined restriction in outlet line 22. Because of these predetermined factors, one can deduce the qualitative leakage rate associated with fuel cap 30 based on the maximum pressure measured in pressurizable region 57.

Master orifice 24 is sized to create a predetermined restriction in outlet line 22 that metes the flow of air through outlet line 22 and retards the rise of pressure in pressurizable region 57 when valve 63 is moved to the opened position. If a restriction is not placed in outlet line 22, the air pressure in pressurizable region 57 would rise nearly instantaneously to the pressure level in air reservoir 61. Thus, master orifice 24 functions as a flow restrictor to provide a pressure drop and retard the flow of air through outlet line 22. Other restrictions, such as a capillary tube, a permeable member made of sintered metal or other porous material, and an air flow passage comprising two or more apertures of a suitable size arranged in a suitable pattern relative to one another, may also be used to provide the predetermined flow restriction.

Such an instantaneous rise in air pressure in pressurizable region 57 would not allow much, if any, air to leak past fuel cap 30 before pressurizable region 57 reached its maximum fluid pressure. Thus, the maximum air pressure level in pressurizable region 57 would be virtually the same for each fuel cap being tested. Master orifice 24 delays the rise in air pressure in pressurizable region 57 of test base 20 so that some air leaks past the fuel cap being tested and pressurizable region 57 has its own maximum air pressure associated with each fuel cap being tested, as shown in FIGS. 4 and 5.

Master orifice 24 regulates the flow of air from air reservoir 61 in pump unit 12 to pressurizable region 57 in test base 20 by gradually introducing air pressure from air reservoir 61 into pressurizable region 57. This provides pressurizable region 57 with a gradual rise and fall in air pressure so that different quantities of air leak past each fuel cap to be tested dependent on the leakage rate associated with each fuel cap. These different quantities of air leakage create different peak pressure levels in pressurizable region 57 for each fuel cap tested. Thus, a fuel cap with a high associated leakage rate will permit more air to leak past the fuel cap before pressurizable region reaches the maximum fluid pressure than a fuel cap with a low associated leakage rate.

As air gradually flows through outlet line 22 to pressurizable region 57, the air pressure in pressurizable region 57 gradually rises, as shown in FIGS. 4 and 5. This rise in air pressure occurs because the leakage flow rate associated with fuel cap 30 at that particular time is less than the air flow rate through outlet line 22. Eventually, the air pressure in air reservoir 61 lowers enough and the air pressure in pressurizable region 57 rises enough that air will leak past fuel cap 30 at a rate equal to the air flow rate through master orifice 24. At this moment, the air pressure in pressurizable region 57 will reach a maximum, as shown in FIGS. 4 and 5, at points 70, 72, and 74 for three different leakage rates. As air flows out of air reservoir 61, the air pressure level in air reservoir 61 continually decreases, as shown in FIG. 5. Likewise, the air pressure in pressurizable region 57 begins to decrease after it reaches its maximum, as shown in FIGS. 4 and 5.

One can use the maximum air pressure in pressurizable region 57 to deduce whether the fuel cap being tested passes or fails a predetermined fuel cap leakage rate specification without having to observe a pressure decay time. If pressurizable region 57 has a maximum air pressure for a calibration fuel cap that just meets a predetermined fuel cap leakage rate specification, one can deduce whether a fuel cap being tested passes the predetermined fuel cap leakage rate specification by comparing the maximum air pressure for pressurizable region 57 for the fuel cap being tested to the maximum air pressure for pressurizable region 57 for the fuel cap that just meets the predetermined fuel cap leakage rate specification.

Any fuel cap being tested that reaches a maximum air pressure in pressurizable region 57 above thirty inches of water (7.47 kilopascals), in accordance with the example shown in FIG. 5, corresponds to a leakage flow rate less than sixty cubic centimeters per minute and will pass the predetermined specification. Thus, a fuel cap with an associated maximum air pressure level in pressurizable region 57 of thirty inches of water (7.47 kilopascals) or greater will comply with the predetermined specification; and a fuel cap with an associated maximum air pressure in pressurizable region 57 of less than thirty inches of water (7.47 kilopascals) will fail to comply with the predetermined specification.

As shown in FIG. 5, when the maximum air pressure in pressurizable region 57 associated with a fuel cap (represented by alternating dashed and dotted line 64, as shown in FIG. 5) is greater than thirty inches of water (7.47 kilopascals), one can deduce that the leakage flow rate of the fuel cap being tested (thirty cubic centimeters per minute) is less than the predetermined specification (sixty cubic centimeters per minute) and the fuel cap will pass the predetermined specification. When the maximum air pressure in pressurizable region 57 associated with a fuel cap (represented by dashed line 62, as shown in FIG. 5) is less than thirty inches of water (7.47 kilopascals), one can deduce that the leakage flow rate of the fuel cap being tested (90 cubic centimeters per minute) is greater than the predetermined specification (sixty cubic centimeters per minute) and the fuel cap will fail the predetermined specification.

The predetermined resistance and pressure drop provided by master orifice 24 is a function of the "flow area" of master orifice 24. Flow area is the cross-sectional area perpendicular to the air flow. For example, the flow area of master orifice 24 is the transverse cross-sectional area of the precision-drilled hole. The magnitude of the predetermined pressure drop varies as a function of time, the predetermined pressure level in air reservoir 61, and the leakage rate associated with the cap to be tested. The flow area of master orifice 24 is selected based on these criteria. Flow areas of different sizes may be selected based on changes in factors, such as the predetermined specification, the predetermined fluid pressure in air reservoir 61, and the volume of air reservoir 61. Thus, many combinations of flow area, predetermined fluid pressure in air reservoir 61, and the volume of air reservoir 61 are within the scope of this disclosure.

Master orifice 24 provides a restriction in outlet line 22 that provides the predetermined pressure drop and retards the flow of pressurized fluid through outlet line 22. The restriction provided by orifice 24 is significant enough to make any "head loss" associated with frictional losses of outlet line 22 relatively minimal in comparison to the resistance and pressure drop associated with master orifice 24. For example, outlet line 22 includes an inside diameter 73 and flow area that is greater than an inside diameter 75 and flow area of master orifice 24, as shown in FIG. 3. In a preferred embodiment, inside diameter 75 of master orifice 24 is 0.0039 inches (0.0099centimeters) and the flow area is 0.0000119 square inches (0.000077 square centimeters). This difference in diameter size decreases the relative head loss of frictional losses of outlet line 22 when compared to the predetermined pressure drop across master orifice 24.

In one alternative embodiment (not shown), the position of master orifice 24 and activation switch 26 are reversed. Master orifice 24 is thus positioned to lie between switch 26 and test base 20 instead of being positioned to lie between switch 26 and pump unit 12.

Figure 9:
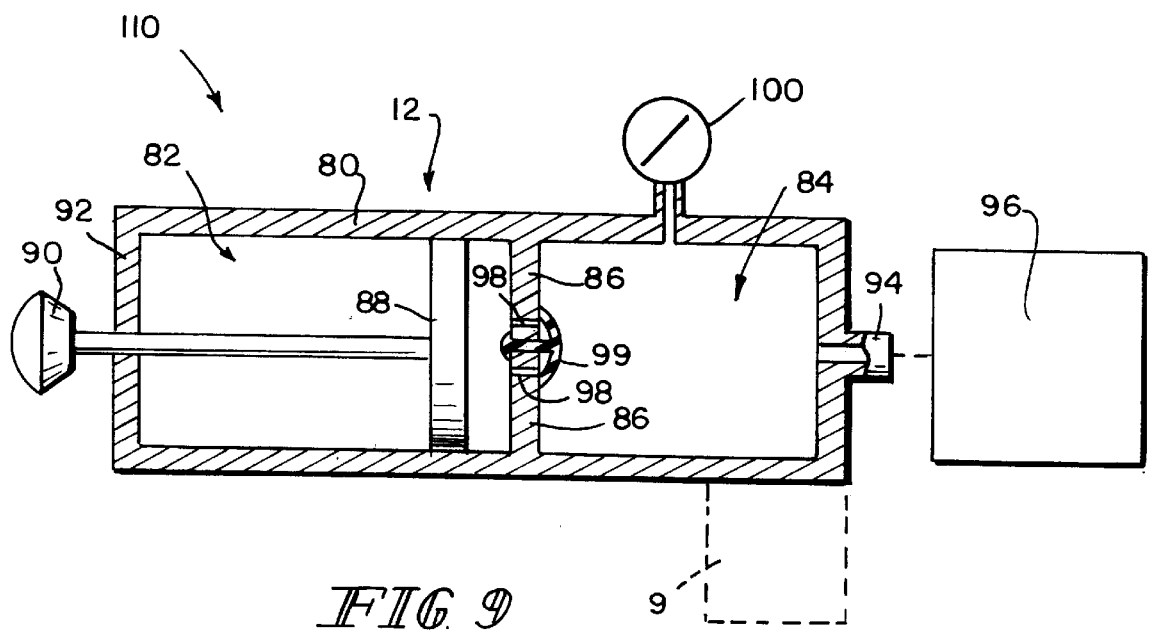
FIG. 9 is a diagrammatic view of an alternative embodiment of a fuel cap leakage tester showing a housing divided into a pump chamber and a reservoir chamber by an interior partition wall, a piston positioned to lie in the pump chamber, a handle coupled to the piston and extending out of the pump chamber beyond a first end wall of the housing, the handle being movable to pressurize the reservoir chamber, and an outlet line extending from a second end wall of the housing to the rest of the fuel cap leakage tester, the outlet line being in fluid communication with the reservoir chamber.

In another alternative embodiment of leakage tester 110 shown in FIG. 9, pump unit 12 includes a single housing 80 that is divided into a pump chamber 82 and an air reservoir 84 by an interior partition wall 86, as shown in FIG. 9. Leakage tester 110 includes a piston 88 positioned to lie in pump chamber 82. A pump handle 90 is coupled to piston 88 and extends out of pump chamber 82 beyond a first end wall 92 of housing 80. Pump handle 90 is movable to pressurize reservoir chamber 84 in a manner that is substantially similar to the manner in which pump handle 14 of leakage tester 10 moves to pressurize chambers 40, 45 of pump unit 12. Wall 86 is formed to include air flow apertures 98 and leakage tester 110 includes a check valve 99 and a pressure-relief valve 100 that operate to control the pressurization of reservoir chamber 84. Leakage tester 110 also includes an outlet line 94 extending from housing 80 to the other components of leakage tester 110 which are represented generally by a block 96. Outlet line 94 of leakage tester 110 is substantially similar to outlet line 22 of leakage tester 10.

Figures 10, 11:
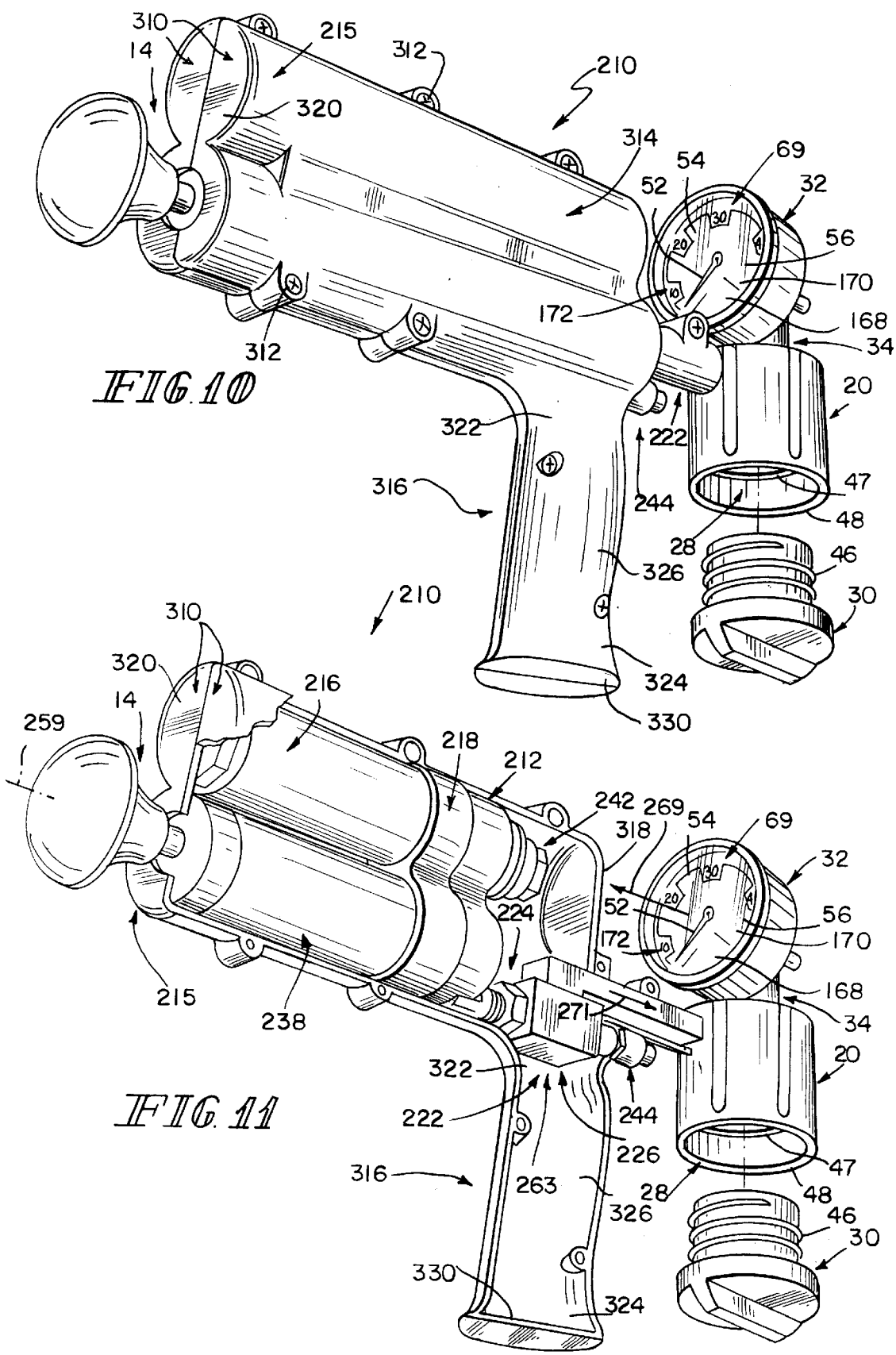
FIG. 10 is a perspective view of a preferred embodiment of a fuel cap leakage tester showing a case configured to house a pump chamber and an air reservoir provided in a pair of tubes arranged to lie in side-by-side relation, a grip handle appended to an underside of the case, a test base, a pressure gauge, and a fuel cap to be tested.
FIG. 11 is a perspective view similar to FIG. 10 of the fuel cap leakage tester, with portions broken away, to show the two tubes housed in the case, the lower tube including a pump chamber and a first air chamber and the upper tube including a second air chamber coupled to the first air chamber.

In a presently preferred embodiment shown in FIGS. 10–13, fuel cap leakage tester 210 includes a pump unit 212, a case 215 sized to receive pump unit 212, and a test base 20 coupled to pump unit 212 by an outlet line 222 that extends from pump unit 212 to test base 20 through a series combination of a master orifice 224 and an activation switch 226, and a pressure gauge 32 coupled to test base 20, as shown in FIG. 11. Pump unit 212 includes a first tube 238 and a second tube 216 coupled to first tube 238 by a coupling 218. The first and second tubes 238 and 216 are housed in case 215. Pump unit 212 also includes pump handle 14 that extends beyond an end cap 201 which is attached to first tube 238.

Figure 12:
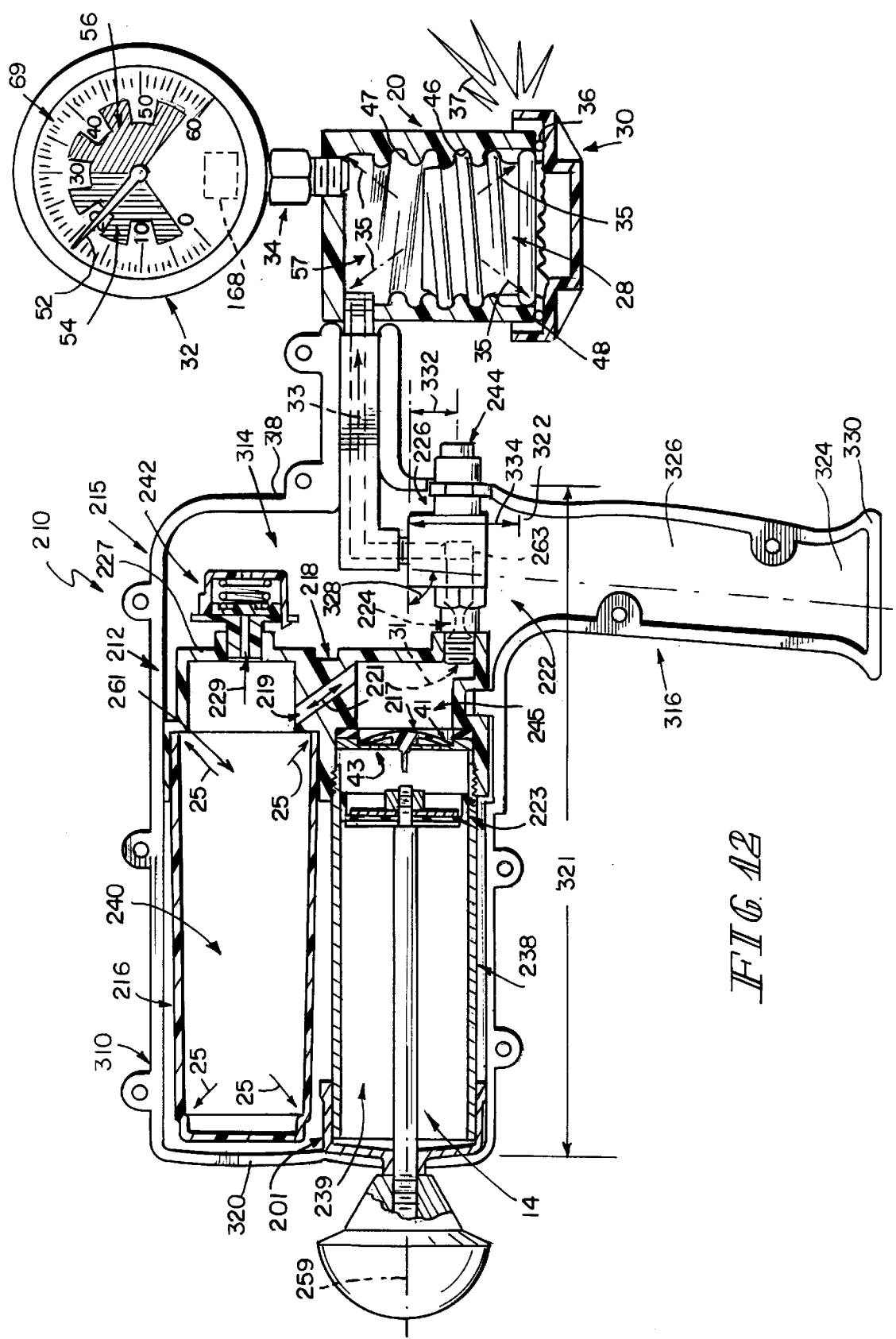
FIG. 12 is an enlarged cross-sectional view of the fuel cap leakage tester of FIG. 10 showing a "failing" fuel cap coupled to the test base, the activation switch including a valve moved to an opened position to test the fuel cap, a large amount of pressurized air leaking past the fuel cap, and the pressure gauge indicating that the fuel cap has failed the test.

Pump unit 212 further includes an interior wall 217 inside first tube 238 that partitions the interior region of first tube 238 into a pump chamber 239, and an air chamber 245, as shown in FIG. 12. Pump unit 212 further includes an air chamber 240 defined by second tube 216 and coupling 218 formed to include a passage 219. Passage 219 allows air to move between air chamber 245 and air chamber 240, as indicated by a double-headed arrow 221 shown in FIGS. 12 and 13. Pump unit 212 includes a piston 223 inside pump chamber 239 and pump handle 14 is coupled to piston 223. Pump unit 212 operates in a manner substantially similar to pump unit 12 of fuel cap leakage tester 10 to charge a pressurized air reservoir 261 defined by air chambers 245, 240.

Fuel cap leakage tester 210 includes a pressure-relief valve 242 mounted on an end cap 227 attached to an end of second tube 216, as shown in FIG. 12. Valve 242 is in fluid communication with air chamber 240 of second tube 216, as indicated by arrow 229 shown in FIGS. 12 and 13. Valve 242 operates in a manner substantially similar to valve 42 of fuel cap leakage tester 10 but opens at one hundred forty-five inches (145 ") of water (36.1 kilopascals).

Figure 13:
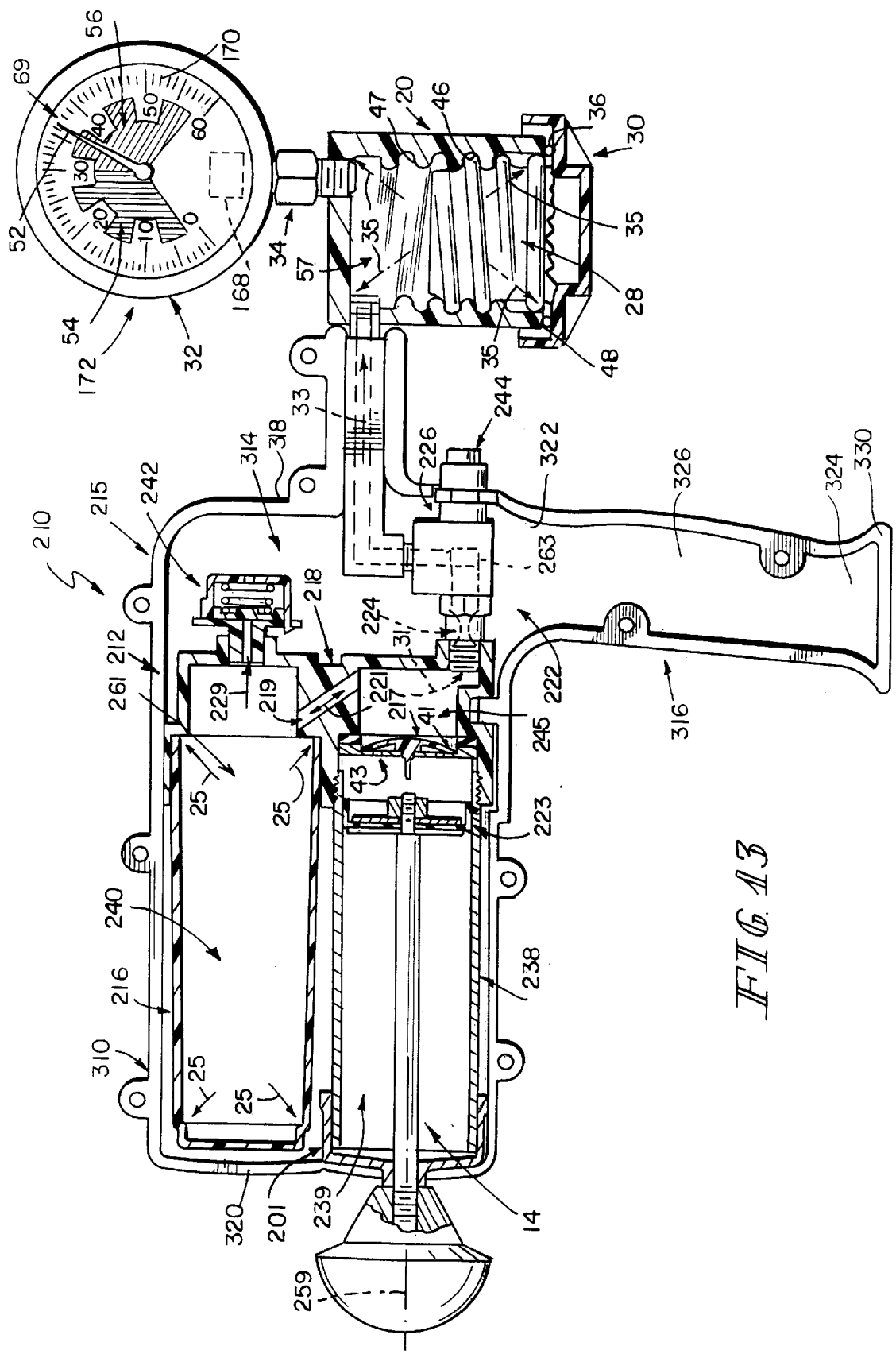
FIG. 13 is a cross-sectional view similar to FIG. 12 showing a "passing"fuel cap coupled to the test base, the valve of the activation switch moved to the opened position, and the pressure gauge indicating that the fuel cap has passed the test.

Activation switch 226 is positioned to lie along outlet line 222 and includes a valve 263, similar to valve 63 of fuel cap leakage tester 10, and a button 244 that can be pressed by an operator to move valve 263 from a closed position, shown in FIG. 11, to an opened position, shown in FIGS. 12 and 13. Valve 263 is operated in a manner substantially similar to valve 63 of fuel cap leakage tester 10 during testing of fuel cap 30.

Fuel cap leakage tester 210 is operated in a manner substantially similar to fuel cap leakage tester 10. Fuel cap 30 is mounted on a test base 20 or cap adapter 180, if required, valve 263 is opened, and the maximum air pressure level is observed on pressure gauge 32 to determine whether fuel cap 30 passes or fails the predetermined fuel cap leakage rate specification. The pressure versus time of air reservoir 261 and pressurizable region 57 of test base 20 is believed to decay in a similar fashion as air reservoir 61 of fuel cap leakage detector 10 and pressurizable region 57 of test base 20 of fuel cap leakage detector 10, except that pressurizable region 57 begins at one hundred forty-five inches of water (36.1 kilopascals).

Case 215 includes two halves 310 that surround and protect pump unit 212, as shown in FIGS. 10 and 11. Each half 310 of case 215 is coupled to the other half 310 by fasteners such as screws 312. Case 215 shares central axis 259 with the remainder of fuel cap leakage tester 210. Halves 310 cooperate to define a body portion 314. A handle portion 316 is coupled to body portion 314 of case 215 to function as a hand grip. Body portion 314 includes a first end 318, a second end 320 spaced apart from first end 318, and a length 321 extending between first and second ends 318, 320 along central axis 259.

Handle portion 316 is configured to aid in pumping pump handle 14 and testing fuel cap 30. As shown in FIG. 12, handle portion 316 includes an upper portion 322 coupled to body portion 316 of case 215, a lower portion 324 spaced apart from upper portion 322, and a middle portion 326 positioned to lie between upper and lower portions 322, 324. As shown in FIG. 10, handle portion 316 is cantilevered to body portion 314 of case 215 away from central axis 259. Thus, handle portion 316 extends at an angle 328, as shown in FIG. 12, about perpendicular to pump handle 14. This configuration relative to pump handle 14 provides a convenient handle for holding fuel cap leakage tester 210 during pumping.

Handle portion 316 is configured to enable a user to grip tester 210 easily. Middle portion 326 is enlarged relative to upper and lower portions 322, 324 to provide a palm-receiving bulge. Likewise, lower portion 324 includes a tapered collar 330 that provides a lip that contours with the bottom of a person's palm (not shown).

As shown in FIG. 12, button 244 is positioned to lie adjacent to first end 318 of body portion 314. Button 244 is positioned to lie at a first distance 332 from central axis 259 and upper portion 322 is positioned to lie at a second distance 334 that is less than first distance 332. By placing button 244 adjacent to first end 318 and at a relative distance from upper portion 322, button 244 is positioned for easy activation by a user's index finger (not shown) if the user is gripping handle portion 316.

Passage 222 extends from first end 318 to test base 20 in a first direction 271 along central axis 259 and visual display 170 faces in a second direction 269 along central axis 259 opposite first direction 271, as shown in FIG. 11. Thus, as a user tests fuel cap 30, visual display 170 is convenient to read.

Figure 14:
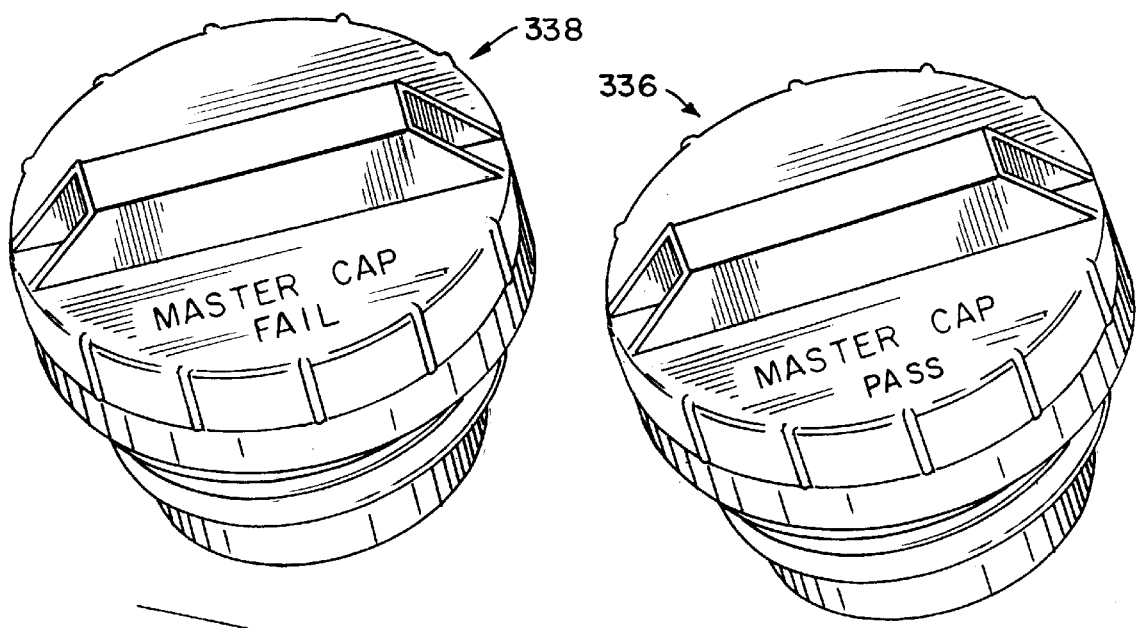
FIG. 14 is a perspective view of a pass-calibration fuel cap and a fail-calibration fuel cap used to test the integrity of the fuel cap leakage detector.

Fuel cap leakage tester 210 also includes a pass-calibration fuel cap 336 and a fail calibration fuel cap 338, as shown in FIG. 14. Pass and fail-calibration fuel caps 336, 338 should be used at the beginning of each workday to test the accuracy of fuel cap leakage tester 210. Pass-calibration fuel cap 336 is configured to have an associated leakage flow rate that complies with the predetermined specification and fail-calibration fuel cap 338 is configured to have an associated leakage flow rate that is greater than the associated leakage flow rate of pass-calibration fuel cap 336 and fails to comply with the predetermined specification.

To test the accuracy of fuel cap leakage tester 210, pass-calibration fuel cap 336 is mounted on test base 20 to form a sealed connection therewith and a leakage test is performed. If indicator needle 52 fails to indicate that pass-calibration fuel cap 336 passes the predetermined specification, then fuel cap leakage tester 210 should be serviced. Next, fail-calibration fuel cap 338 is mounted on test base 20 to form a sealed connection therewith and a leakage test is performed. If indicator needle 52 fails to indicate that fail-calibration fuel cap 336 fails the predetermined specification, then fuel cap leakage tester 210 should be serviced.

Although the invention has been described in detail with reference to certain preferred embodiments, variations and modifications exist within the scope and spirit of the invention as described and defined in the following claims.

What is claimed is:

1. A fuel cap leakage tester comprising:
    a fuel cap support formed to include a test chamber and adapted to receive a fuel cap to be tested in the test chamber to establish a pressurizable region therein and a sealed connection between the fuel cap to be tested and the fuel cap support,
    a pressure source,
    a monitor positioned to communicate with the pressurizable region formed in the fuel cap support and configured to measure air pressure in the pressurizable region, and
    means for communicating a flow of pressurized air from the pressure source to the pressurizable region with a predetermined pressure drop of the pressurized air therebetween to cause the pressure level of the pressurized air in the pressurizable region to be less than the pressure level of the pressurized air in the pressure source so that the monitor measures the pressure level of the pressurized air in the pressurizable region during discharge of the pressurized air from the pressurizable region through an air leak path between the fuel cap to be tested and the fuel cap support at an unknown flow rate to determine whether the unknown flow rate associated with the fuel cap to be tested meets or exceeds a predetermined leakage flow rate to establish that the sealed connection between the fuel cap to be tested and the fuel cap support complies with a predetermined fuel cap leakage rate specification.

2. The tester of claim 1, wherein the fuel cap support includes a test base formed to include the test chamber and a cap connector configured to mount a fuel cap to be tested in the test chamber.

3. The tester of claim 2, wherein the monitor is a pressure gauge coupled to the test base.

4. The tester of claim 1, wherein the fuel cap support includes a test base formed to include a first portion of the test chamber and a cap adapter formed to include a second portion of the test chamber and a cap connector configured to mount a fuel cap to be tested in the test chamber and coupled to the test base to place the first and second portions in fluid communication.

5. The tester of claim 4, wherein the monitor is a pressure gauge coupled to the test base.

6. The tester of claim 1, wherein the pressure source includes a pressure reservoir coupled to the communicating means and a pressurizer coupled to the pressure reservoir and configured to force compressed air into the pressure reservoir.

7. The tester of claim 6, wherein the pressure reservoir includes a first air chamber coupled to the communicating means, a second air chamber, and a passage arranged to couple the first and second air chambers in fluid communication.

8. The tester of claim 7, wherein the pressurizer is coupled to the first air chamber to force pressurized air therein.

9. The tester of claim 7, wherein the pressure source further includes a first tube containing the pressurizer and the first air chamber and a second tube containing the second air chamber.

10. The tester of claim 7, wherein the pressure source further includes a pressure-relief valve coupled to the second air chamber and configured to vent air from the second air chamber once air pressure in the second air chamber exceeds a predetermined level.

11. The tester of claim 7, wherein the pressure source further includes a one-way check valve arranged to control flow of compressed air from the pressurizer into first air chamber.

12. The tester of claim 6, wherein the pressure source includes a case containing the pressurizer and the pressure reservoir and a grip handle appended to an underside of the case.

13. The tester of claim 12, wherein the pressure source further includes a first tube containing the pressurizer and a first portion of the pressure reservoir and a second tube containing a second portion of the pressure reservoir and the first and second tubes are positioned to lie in side-by-side relation in the case.

14. The tester of claim 6, wherein the pressure source includes a case, a grip handle appended to the case, a first tube contained in the case and configured to contain the pressurizer and a portion of the air reservoir, and a second tube configured to include another portion of the air reservoir and arranged to lie in the case in a position between the first tube and the grip handle.

15. The tester of claim 6, wherein the pressure source includes a case, a grip handle appended to the case, a first tube contained in the case and configured to contain a portion of the air reservoir, and a second tube configured to contain the pressurizer and another portion of the reservoir and arranged to lie in the case in a position between the first tube and the grip handle.

16. The tester of claim 6, wherein the pressure source further includes a tube configured to contain the pressurizer and the pressure reservoir and a pressure-relief valve is mounted on the tube and coupled to the pressure reservoir to vent air from the pressure reservoir once air pressure in the pressure reservoir exceeds a predetermined level.

17. The tester of claim 1, wherein the monitor includes a pressure detector in communication with the pressurizable region and an indicator coupled to the pressure detector to indicate the air pressure extant in the pressurizable region.

18. The tester of claim 17, wherein the indicator includes a visual display including a pass region and a fail region and an indicator needle positioned to move over the pass and fail regions and linked to the pressure detector.

19. The tester of claim 18, wherein the visual display further includes a pressure scale extending into the pass and fail regions.

20. The tester of claim 18, wherein the visual display includes a scale configured to demarcate air pressure units and the indicator needle is configured to signal the air pressure level in the pressurizable region on the scale.

21. The tester of claim 18, wherein the visual display includes a fail indicia positioned to lie on a left half of the visual display and a pass indicia positioned to lie on a right half of the visual display and the indicator needle is configured to point to the pass indicia when the sealed connection complies with the predetermined specification and a fail indicia when the sealed connection fails to comply with the predetermined specification.

22. The tester of claim 1, wherein the communicating means includes an outlet line configured to conduct pressurized air from the pressure source to the pressurizable region and a master orifice located in the outlet line and configured to meter air flowing therethrough at a predetermined flow rate.

23. The tester of claim 22, wherein the communicating means further includes a first filter located in the outlet line in a position between the pressure source and the master orifice and a second filter located in the outlet line in a position between the master orifice and the pressurizable region.

24. The tester of claim 23, wherein each of the first and second filters is a twenty-five micron screen.

25. The tester of claim 22, wherein the communicating means further includes a filter located in the outlet line.

26. The tester of claim 25, wherein the filter is a screen.

27. The tester of claim 22, wherein the communicating means further includes a valve located in the outlet line in a position between the master orifice and the pressurizable region and arranged to move between a closed position blocking flow of pressurized air from the master orifice to the pressurizable region and an opened position allowing flow of pressurized air at the predetermined flow rate from the master orifice to the pressurizable region.

28. The tester of claim 27, wherein the communicating means further includes a push button coupled to the valve.

29. A fuel cap leakage tester comprising:
a fuel cap support formed to include a test chamber and adapted to receive a fuel cap to be tested in the test chamber to establish a pressurizable region therein and a sealed connection between the fuel cap to be tested and the fuel cap support,
a pressure source,
a monitor positioned to communicate with the pressurizable region formed in the fuel cap support and configured to measure air pressure in the pressurizable region, and
means for communicating a flow of pressurized air between a pressure source to the pressurizable region, the communicating means including a passage extending between the pressure source and having a flow area and a flow restrictor positioned to lie in the passage and having a predetermined flow area less than the flow area of the passage so that the monitor measures the pressure level of the air in the pressurizable region during discharge of the pressurized air from the pressurizable region through an air leak path between the fuel cap to be tested and the fuel cap support at an unknown flow rate to determine whether the unknown flow rate associated with the fuel cap to be tested meets or exceeds a predetermined leakage flow rate to establish that the sealed connection between the fuel cap to be tested and the fuel cap support complies with a predetermined fuel cap leakage rate specification.

30. The tester of claim 29, wherein the flow restrictor is an orifice formed to include a hole sized to permit flow of pressurized air to the pressurizable region formed in the fuel cap support so that the pressure level of pressurized fluid in the pressurizable region reaches a peak greater than a predetermined pressure level when the fuel cap to be tested complies with the predetermined specification.

31. The tester of claim 29, wherein the communicating means further includes a valve positioned to lie between the flow restrictor and the pressurizable region formed in the fuel cap support for movement between a closed position blocking the flow of pressurized fluid through the flow restrictor and an opened position permitting the flow of pressurized fluid through the flow restrictor.

32. The tester of claim 29, wherein the communicating means further includes a filter positioned to lie between the pressure source and the flow restrictor.

33. The tester of claim 32, wherein the communicating means further includes another filter positioned to lie between the flow restrictor and the pressurizable region formed in the fuel cap support.

34. The tester of claim 29, further comprising a first calibration fuel cap adapted to be received in the test chamber of the fuel cap support to form a first sealed connection between the first calibration fuel cap and the fuel cap support cap having a first predetermined flow rate and a second calibration fuel cap adapted to be received in the test chamber of the fuel cap support to form a second sealed connection between the second calibration fuel cap and the fuel cap support having a second predetermined flow rate that is less than the first predetermined flow rate.

35. The tester of claim 34, wherein the first calibration fuel cap is configured to comply with the predetermined fuel cap leakage rate specification and the second calibration fuel cap is configured to fail to comply with the predetermined fuel cap leakage rate specification.

36. A fuel cap leakage tester comprising:
a measuring device including a fuel cap support formed to include a pressurizable region and a monitor in communication with the pressurizable region,
an air supply coupled to the measuring device,
and a case having a central axis, a body portion configured to receive the air supply and having a length extending along the central axis, and a handle portion cantilevered to the body portion away from the central axis.

37. The tester of claim 36, wherein the air supply includes a pump handle extending from the body portion along the central axis and the handle portion of the case is positioned to lie substantially perpendicular to the pump handle.

38. The tester of claim 36, wherein the body portion includes a first end and a second end spaced apart from the first end, the air supply includes a pump handle extending from the second end, and the handle portion of the case extends from the first end.

39. The tester of claim 36, wherein the handle portion of the case includes an upper portion, a lower portion spaced apart from the upper portion, and a middle portion positioned to lie between the upper and lower portions and configured to protrude relative to the upper and lower portions.

40. The tester of claim 39, wherein the handle further includes a collar coupled to the lower portion.

41. The tester of claim 36, wherein the body portion of the case includes a first end and a second end spaced apart from the first end, the handle portion extends from the first end, the air supply extends through the first end and includes a switch including a valve and a button coupled to the valve and positioned to lie adjacent to the first end.

42. The tester of claim 41, wherein the handle portion of the case includes an upper portion coupled to the body portion of the base at a first distance from the central axis and a lower portion spaced apart from the upper portion, and the button of the switch is positioned to lie a second distance from the central axis that is less than the first distance.

43. The tester of claim 42, wherein the body portion of the case includes a first end and a second end spaced apart from the first end, the handle portion extends from the first end, the air supply extends through the first end of the body portion along the central axis in a first direction, and the monitor of the measuring device includes a visual display facing in a second direction opposite the first direction.

44. A fuel cap leakage tester comprising:

a fuel cap support formed to include a test chamber and adapted to receive a fuel cap to be tested in the test chamber to establish a pressurizable region therein and a sealed connection between the fuel cap to be tested and the fuel cap support, a pressure source, a monitor positioned to communicate with the pressurizable region formed in the fuel cap support and configured to measure a rate of air flow through the pressurizable region, and means for communicating a flow of pressurized air from the pressure source to the pressurizable region with a predetermined pressure drop of the pressurized air therebetween to cause the pressure level of the pressurized air in the pressurizable region to be less than the pressure level of the pressurized air in the pressure source so that the monitor measures the rate of air flow of the pressurized air through the pressurizable region during discharge of the pressurized air from the pressurizable region through an air leak path between the fuel cap to be tested and the fuel cap support at an unknown flow rate to determine whether the unknown flow rate associated with the fuel cap to be tested meets or exceeds a predetermined leakage flow rate to establish that the sealed connection between the fuel cap to be tested and the fuel cap support complies with a predetermined fuel cap leakage rate specification.

* * * * *